(12) United States Patent
Higashiyama et al.

(10) Patent No.: US 10,916,223 B2
(45) Date of Patent: Feb. 9, 2021

(54) DISPLAY DEVICE, AND DISPLAY CONTROL METHOD

(71) Applicant: HONDA MOTOR CO., LTD., Tokyo (JP)

(72) Inventors: Masafumi Higashiyama, Wako (JP); Takuya Kimura, Wako (JP); Shinji Kawakami, Wako (JP); Tatsuya Iwasa, Wako (JP); Yuji Kuwashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/517,881

(22) Filed: Jul. 22, 2019

(65) Prior Publication Data
US 2020/0051531 A1    Feb. 13, 2020

(30) Foreign Application Priority Data

Aug. 7, 2018    (JP) .................................. 2018-148334

(51) Int. Cl.
*G09G 5/373*    (2006.01)
*G09G 5/10*    (2006.01)
*G09G 5/38*    (2006.01)
*G02B 27/01*    (2006.01)
*B60K 35/00*    (2006.01)

(52) U.S. Cl.
CPC ......... *G09G 5/373* (2013.01); *G02B 27/0101* (2013.01); *G09G 5/10* (2013.01); *G09G 5/38* (2013.01); *B60K 35/00* (2013.01); *B60K 2370/1529* (2019.05); *B60K 2370/31* (2019.05); *B60K 2370/349* (2019.05); *G02B 2027/0141* (2013.01); *G09G 2320/0626* (2013.01); *G09G 2340/045* (2013.01); *G09G 2340/0464* (2013.01); *G09G 2354/00* (2013.01); *G09G 2380/10* (2013.01)

(58) Field of Classification Search
None
See application file for complete search history.

(56) References Cited

U.S. PATENT DOCUMENTS

2003/0128184 A1* 7/2003 Broussard ............. G06F 40/174
345/156
2012/0042289 A1* 2/2012 Cragun ............... G06F 16/9577
715/865

(Continued)

FOREIGN PATENT DOCUMENTS

JP    2017-091115    5/2017

*Primary Examiner* — Aaron M Richer
(74) *Attorney, Agent, or Firm* — Amin, Turocy & Watson, LLP

(57) ABSTRACT

A display device includes an image generator configured to generate a service image to be visually recognized by an observer by outputting light for forming an image toward a reflector reflecting incident light toward the observer's eyes and superimposing the light on a scene, a receiver configured to receive the observer's operation of reducing a visibility of the image, and a controller configured to control a visibility of the service image in accordance with the operation performed on the receiver, and the controller is configured to cause the image generator to generate a warning image in a case in which the operation of reducing the visibility to a predetermined degree is performed.

6 Claims, 12 Drawing Sheets

(56) References Cited

U.S. PATENT DOCUMENTS

| | | | |
|---|---|---|---|
| 2014/0022223 A1* | 1/2014 | Jung | G09G 5/10 345/207 |
| 2015/0287164 A1* | 10/2015 | Kominar | G06T 1/00 345/647 |
| 2019/0162959 A1* | 5/2019 | Lee | G02B 5/09 |
| 2020/0201043 A1* | 6/2020 | Sugiyama | G02B 6/003 |

* cited by examiner

| IMAGE | EVENT |
|-------|-------|
| 001 | A |
| 002 | B |
| 003 | C |
| ⋮ | ⋮ |
| 011 | D |
| 012 | E |
| 013 | F |
| ⋮ | ⋮ |

DISPLAY DEVICE, AND DISPLAY CONTROL METHOD

CROSS-REFERENCE TO RELATED APPLICATION

The application is based on Japanese Patent Application No. 2018-148334 filed on Aug. 7, 2018, the content of which is incorporated herein by reference.

BACKGROUND

Field

The following embodiments relates to a display device, a display, and control method.

Description of Related Art

In the related art, head up display devices (hereinafter, referred to as head up display (HUD) devices) that display images regarding basic information for drivers on front windshields have become known (for example, see Japanese Unexamined Patent Application, First Publication No. 2017-91115). Various signs indicating an obstacle, a heads-up, and a moving direction are displayed so as to overlap a scene in front of a vehicle by using the HUD device, so that a driver can ascertain various pieces of information displayed while maintaining the direction of the driver's line of sight during driving to be forward (Japanese Unexamined Patent Application, First Publication No. 2017-91115).

However, in the related art, the display of information may be troublesome for the occupant in some cases.

SUMMARY

The following embodiments has been made in consideration of such circumstances and an object of the following embodiments is to provide a display device, and a display control method, which are capable of reducing troublesomeness for an occupant.

A display device, and a display control method according to the following aspects adopt the following constitutions.

(1): A display device according to an aspect includes an image generator configured to generate a service image to be visually recognized by an observer by outputting light for forming an image toward a reflector reflecting incident light toward the observer's eyes and superimposing the light on a scene, a receiver configured to receive the observer's operation of reducing a visibility of the image, and a controller configured to control a visibility of the service image in accordance with the operation performed on the receiver, in which the controller is configured to cause the image generator to generate a warning image in a case in which the operation of reducing the visibility to a predetermined degree is performed.

(2): In the aspect of (1) described above, the operation may be an operation of increasing a depression angle at a position where the service image is visually recognized by the observer.

(3): In the aspect of (1) described above, the operation may be an operation of reducing a luminance of the service image.

(4): In the aspect of (1) described above, the operation may include an operation of increasing a depression angle at a position where the service image is visually recognized by the observer and an operation of reducing a luminance of the service image, and the controller may increase the depression angle at the position where the service image is visually recognized by the observer in accordance with the operation in a case in which the depression angle is less than a maximum depression angle, may reduce the luminance of the service image in accordance with the operation in a case in which the depression angle is the maximum depression angle, and may cause the image generator to output the warning image in a case in which a magnitude of the luminance has reached a threshold value.

(5): In any one of the aspects of (1) to (4) described above, the warning image may be an image including information for inquiring whether to generate the service image.

(6): In the aspect of (1) described above, the operation may include an operation of increasing a depression angle at a position where the service image is visually recognized by the observer and an operation of reducing a size of the service image, and the controller may increase the depression angle at the position where the service image is visually recognized by the observer in accordance with the operation in a case in which the depression angle is less than a maximum depression angle, may reduce the size of the service image in accordance with the operation in a case in which the depression angle is the maximum depression angle, and may cause the image generator to output the warning image in a case in which the size has reached a threshold value.

(7): In the aspect of (1) described above, the operation may include an operation of reducing a luminance of the service image and an operation of reducing a size of the service image, and the controller may reduce the luminance of the service image in a case in which the luminance is less than a minimum luminance, may reduce the size of the service image in accordance with the operation in a case in which the luminance has a minimum value, and may cause the image generator to output the warning image in a case in which the size has reached a threshold value.

(8): A display device according to another aspect includes an image generator configured to generate a service image to be visually recognized by an observer by outputting light for forming an image toward a reflector reflecting incident light toward the observer's eyes and superimposing the light on a scene, a receiver configured to receive the observer's operation of reducing a visibility of the image, a controller configured to control a visibility of the service image in accordance with the operation performed on the receiver, and an output device is configured to output information, in which the controller is configured to cause the output device to output warning information in a case in which the operation of reducing the visibility to a predetermined degree is performed.

(9): In any one of the aspects of (1) to (8) described above, the image generator may include a light projection device is configured to output the image as light, an optical mechanism which is provided on a path of the light and is capable of adjusting a distance from a predetermined position to a position where the light is imaged as a virtual image, a concave mirror is configured to reflect light having passed through the optical mechanism toward a reflector, a first actuator is configured to adjust the position in the optical mechanism, and a second actuator is configured to adjust a reflection angle of the concave mirror.

(10): A display control method using a computer, the computer method comprising: causing an image generator generating a service image to be superimposed on a scene and visually recognized by an observer to generate the service image by outputting light for forming an image toward a reflector reflecting incident light toward the observer's eyes, controlling the visibility of the service image in accordance with an operation performed on a receiver receiving the observer's operation of reducing a visibility of the image, and causing the image generator to generate a warning image in a case in which the operation of reducing the visibility to a predetermined degree is performed.

(11): A non-transitory computer-readable storage medium that stores a computer program to be executed by a computer to perform at least: cause an image generator generating a service image to be superimposed on a scene and visually recognized by an observer to generate the service image by outputting light for forming an image toward a reflector reflecting incident light toward the observer's eyes, cause a visibility of the service image to be controlled in accordance with an operation performed on a receiver receiving the observer's operation of reducing a visibility of the image, and cause the image generator to generate a warning image in a case in which the operation of reducing the visibility to a predetermined degree is performed.

According to the aspects of (1) to (11) described above, it is possible to reduce troublesomeness for an occupant.

BRIEF DESCRIPTION OF THE DRAWINGS

FIG. 6 is a diagram showing an example of details of a correspondence table.

DETAILED DESCRIPTION

Hereinafter, embodiments of a display device, a display control method, and a storage medium will be described with reference to the accompanying drawings. The display device is a device which is mounted on, for example, a vehicle (hereinafter, referred to as a vehicle M) and by which an image is visually recognized by being superimposed on a scene. The display device can be referred to as a HUD device. As an example, the display device is a device that projects light including an image onto a front windshield of the vehicle M and makes an observer visually recognize a virtual image. The observer is, for example, a driver. The observer may be an occupant other than the driver. The display device may be realized by light being projected onto a light transmissive display device (for example, a liquid crystal display or an organic electroluminescence (EL)) which is attached to the front windshield of the vehicle M or a transparent member (a visor, a spectacle lens, or the like) which is included in a device worn on a human body. The display device may be a device to which a light transmissive display device is attached. In the following description, it is assumed that the display device is a device which is mounted on the vehicle M and projects light including an image onto the front windshield.

In the following description, a positional relationship and the like will be appropriately described using an XYZ coordinate system.

[Overall Configuration]

Figure 1:
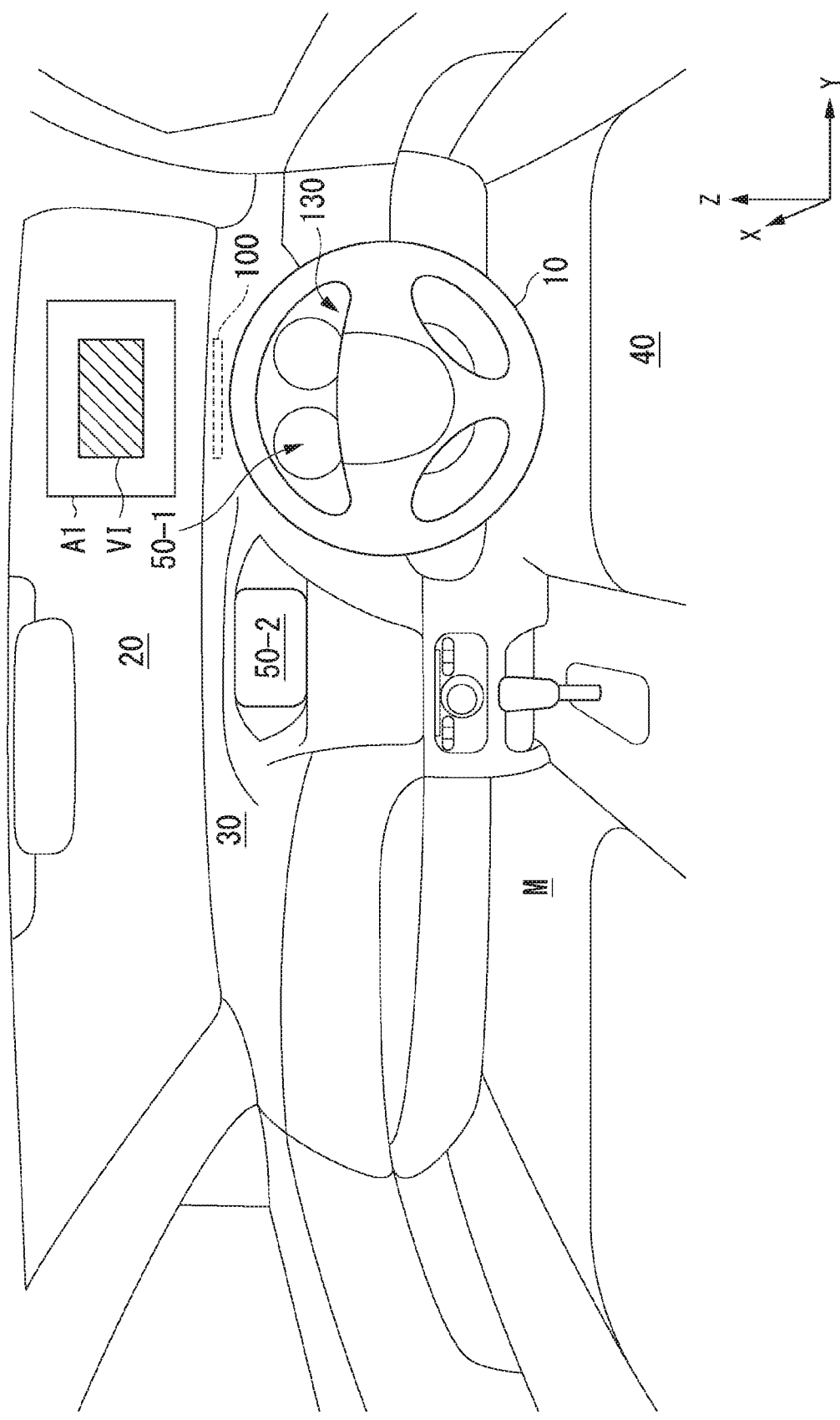
FIG. 1 is a diagram showing a configuration of the interior of a vehicle M on which a display device according to an embodiment is mounted.

FIG. 1 is a diagram showing a configuration of the interior of the vehicle M on which a display device 100 according to an embodiment is mounted. The vehicle M is provided with, for example, a steering wheel 10 that controls steering of the vehicle M, a front windshield (an example of a reflector) 20 that divides the vehicle into the outside of the vehicle and the inside of the vehicle, and an instrument panel 30. The front windshield 20 is a member having light transparency. The display device 100 projects, for example, light including an image onto a displayable area A1 to make a driver sitting on the driver's seat 40 visually recognize a virtual image VI. The displayable area A1 is provided at a portion of the front windshield 20 in front of the driver's seat 40. In the following description, a virtual image may be referred to as an "image" in some cases.

The display device 100 makes the driver visually recognize an image including, for example, information for supporting the driver's driving and information regarding a predetermined event as the virtual image IV. The information for supporting the driver's driving may include information such as the speed of the vehicle M, a driving force distribution ratio, an engine speed, operation-state shift positions of driving support functions, sign recognition results, and intersection positions. The driving support function is, for example, a direction indication function, an adaptive cruise control (ACC), a lane keep assist system (LKAS), a collision mitigation brake system (CMBS), a traffic jam assist function, or the like.

The vehicle M may be provided with a first display 50-1 and a second display 50-2 in addition to the display device 100. The first display 50-1 is a display device. The first display 50-1 is provided, for example, in the vicinity of the front of the driver's seat 40 in the instrument panel 30. The first display 50-1 is visually recognizable by the driver from a gap next to the steering wheel 10 or through the steering wheel 10. For example, the second display 50-2 is attached to the central portion of the instrument panel 30. The second display 50-2 displays, for example, an image corresponding to a navigation process executed by a navigation device (not shown) mounted on the vehicle M, a video of another party in a video call, or the like. The second display 50-2 may display a television program, may reproduce DVD, or may display contents such as a downloaded movie.

The vehicle M is provided with an operation switch (an example of an operator) 130 that receives an instruction for switching between turn-on and turn-off of display performed by the display device 100 and an instruction for adjusting the position of the virtual image VI. For example, the operation switch 130 is attached to a position where the driver sitting on the driver's seat 40 can operate the operation switch 130 without changing his or her posture much. For example, the operation switch 130 may be provided in front of the first display 50-1 or may be provided at a boss portion of the steering wheel 10. The operation switch 130 may be provided to a spoke connecting the steering wheel 10 and the instrument panel 30 to each other.

Figure 2:
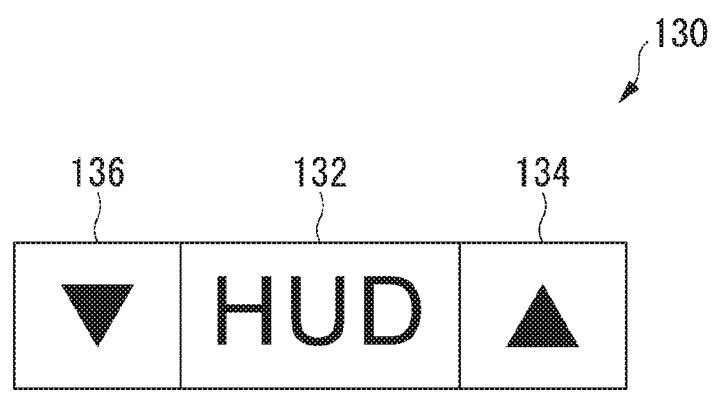
FIG. 2 is a diagram showing an operation switch of the embodiment.

FIG. 2 is a diagram showing the operation switch 130 of the embodiment. The operation switch 130 includes, for example, a main switch 132, an adjustment switch 134, and an adjustment switch 136. The main switch 132 is a switch for switching between turn-on and turn-off of the display device 100.

For example, the adjustment switch 134 is a switch for receiving an instruction for moving the position of the virtual image VI to an upper side (hereinafter, referred to as upwards) with respect to a vertical direction Z. The position of the virtual image VI is a position which is visually recognized so as to be present in a space of being transmitted through the front windshield 20 from a line of sight position P1 of the driver. The driver can continuously move the visual recognition position of the virtual image VI upward within the displayable area A1 by continuously pressing the adjustment switch 134.

The adjustment switch 136 is a switch for receiving an instruction for moving the above-described position of the virtual image VI to a lower side (hereinafter, referred to as downwards) with respect to the vertical direction Z. The driver can continuously move the visual recognition position of the virtual image VI downward within the displayable area A1 by continuously pressing the adjustment switch 136.

The adjustment switch 134 may be a switch for increasing the luminance of the virtual image VI visually recognized instead of (or in addition to) moving the position of the virtual image VI upwards. The adjustment switch 136 may be a switch for reducing the luminance of the virtual image VI visually recognized instead of (or in addition to) moving the position of the virtual image VI downwards. Details of the instructions received by the adjustment switches 134 and 136 may be switched on the basis of any operation. Any operation is, for example, a long-press operation of the main switch 132.

Figure 3:
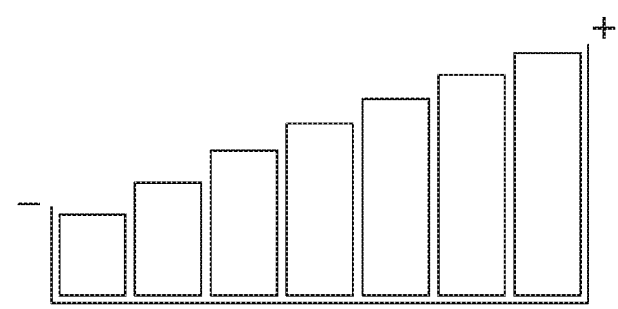
FIG. 3 is a diagram showing an example of an image displayed in a case in which a main switch is long-pressed.

For example, when the main switch 132 is long-pressed, a virtual image shown in FIG. 3 is displayed so as to be visually recognizable by an occupant. For example, the luminance of the virtual image is increased when the adjustment switch 134 is operated in a state where the virtual image is displayed, and the luminance of the virtual image is decreased when the adjustment switch 136 is operated. For example, control may be performed so that the luminance can be adjusted by operating the adjustment switch 134 or 136 when the main switch 132 is long-pressed for a first period of time and so that the size of the virtual image can be adjusted by operating the adjustment switch 134 or 136 when the main switch 132 is long-pressed for a second period of time (>the first period of time). The operation switch 130 may include, for example, a switch for selecting displayed details and a switch for adjusting the luminance of a virtual image which is mainly displayed and the size of a virtual image, in addition to the switches shown in FIG. 2.

Figure 4:
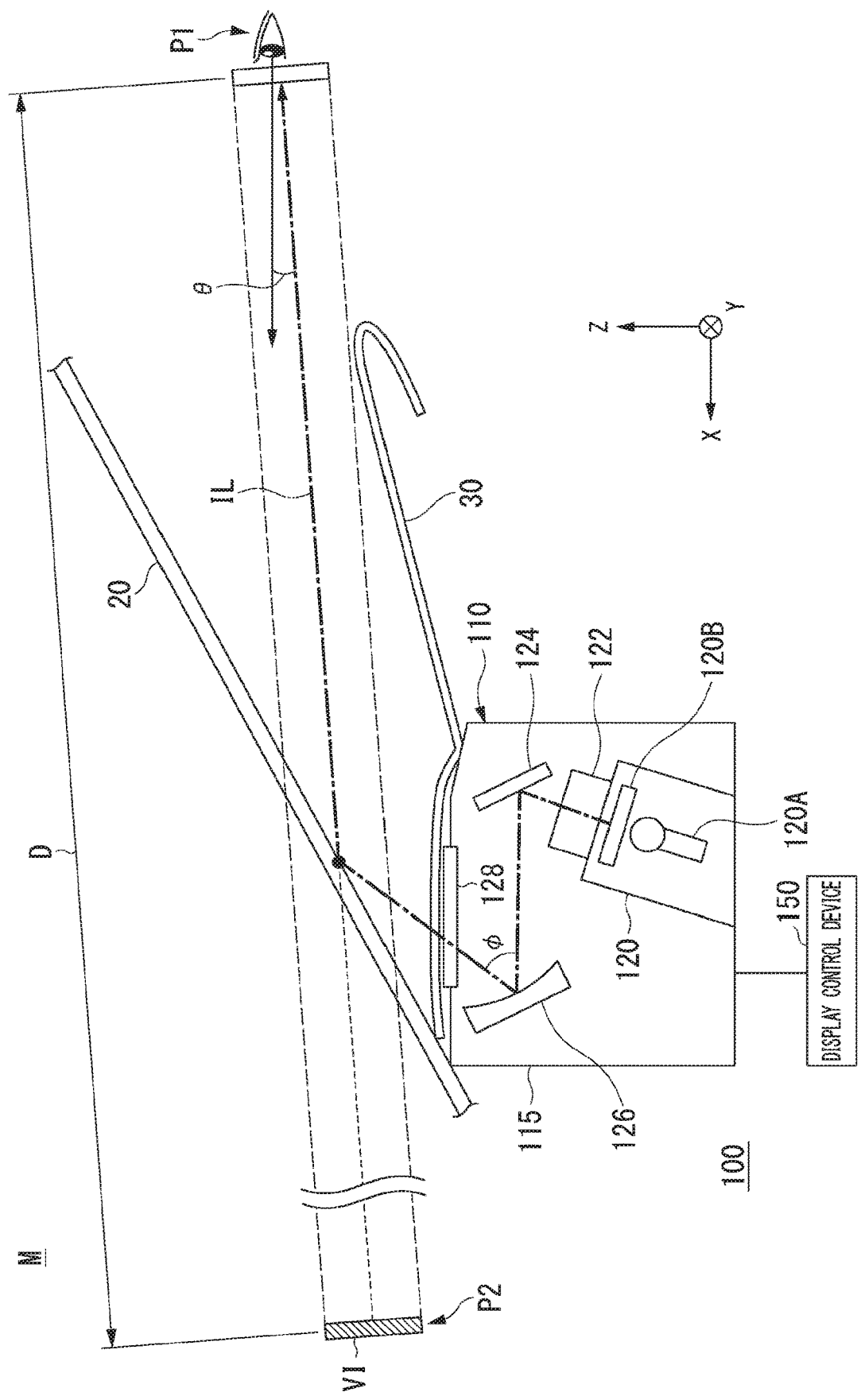
FIG. 4 is a partial configuration diagram of the display device.

FIG. 4 is a partial configuration diagram of the display device 100. The display device 100 includes, for example, a display 110 and a display control device (an example of a control device) 150. The display 110 includes, for example, a housing 115. A light projection device 120, an optical mechanism 122, a plane mirror 124, a concave mirror 126, and a light transmission cover 128 are accommodated in the housing 115. Besides, the display device 100 includes various sensors and an actuator, which will be described later. The display device 100 may be configured so as not to include the optical mechanism 122.

The light projection device 120 includes, for example, a light source 120A and a display element 120B. The light source 120A, which is, for example, a cold-cathode tube, outputs visible light corresponding to the virtual image VI which is visually recognized by the driver. The display element 120B controls the transmission of visible light which is output by the light source 120A. The display element 120B is, for example, a liquid crystal display device (LCD) of a thin film transistor (TFT) type. Each of a plurality of pixels included in the display element 120B is controlled, and the degree of transmission for each color element of visible light which is output by the light source 120A is controlled. Thereby, the form (appearance) of the virtual image IV is determined. Hereinafter, visible light transmitted through the display element 120B and including an image will be referred to as image light IL. In a case in which the display element 120B is an organic EL display, the light source 120A may be omitted.

The optical mechanism 122 is provided on a path of light which is output by the light projection device 120. The optical mechanism 122 adjusts a distance from a predetermined position to a position where light is formed as a virtual image. The optical mechanism 122 includes, for example, one or more lenses. For example, the position of each lens can be adjusted in an optical axis direction. For example, the optical mechanism 122 is provided on a path of the image light IL which is output by the light projection device 120. The light projection device 120 transmits the image light IL which is incident from the light projection device 120 and emits the transmitted image light IL toward the front windshield 20. The optical mechanism 122 can adjust a distance (hereinafter, referred to as a virtual image visible distance D) from the line of sight position P1 of the driver to a formation position P2 at which the image light IL is formed as a virtual image, for example, by changing the position of the lens. The line of sight position P1 of the driver is a position where the image light IL reflected by the concave mirror 126 and the front windshield 20 is condensed and it is assumed that the driver's eyes are present. Strictly speaking, the virtual image visible distance D is a distance of a segment having an inclination in a vertical direction, but the distance may mean a distance in a horizontal direction. In the following description, in a case in which an expression of "virtual image visible distance D is 7 [m]" or the like is given, the distance may be a distance of the above-described segment or may be a distance in the horizontal direction.

In the following description, a depression angle θ will be defined as a formed angle. The formed angle is an angle formed by a horizontal plane passing through the line of sight position P1 and a segment from the line of sight position P1 of the driver to the formation position P2. As the virtual image VI is formed further downward, that is, as a line of sight direction in which the driver views the virtual image VI is a direction further downward, the depression angle θ becomes larger. The depression angle θ is determined on the basis of a reflection angle φ of the concave mirror 126 and a display position of an original image in the display element 120B as will be described later. The reflection angle φ is an angle formed by an incidence direction in which the image light IL reflected by the plane mirror 124 is incident on the concave mirror 126 and an emission direction in which the concave mirror 126 emits the image light IL.

The plane mirror 124 reflects visible light (that is, the image light IL) which is emitted by the light source 120A and passes through the display element 120B in the direction of the concave mirror 126.

The concave mirror 126 reflects the image light IL which is incident from the plane mirror 124 and emits the reflected image light IL toward the front windshield 20. The concave mirror 126 is supported so as to be rotatable around a Y-axis which is an axis in the width direction of the vehicle M.

The light transmission cover 128 transmits the image light IL guided by the concave mirror 126 to make the image light IL reach the front windshield 20 and prevents foreign substances such as dust, dirt, and water droplets from entering the housing 115. The light transmission cover 128 is provided at an opening formed in an upper member of the housing 115. The instrument panel 30 is also provided with an opening or a light transmissive member, and the image light IL passes through the light transmission cover 128 and passes through the opening or the light transmissive member of the instrument panel 30 to reach the front windshield 20.

The image light IL which is incident on the front windshield 20 is reflected by the front windshield 20 and is condensed on the line of sight position P1 of the driver. In this case, the driver feels that an image projected by the image light IL is displayed in front of the vehicle M.

Figure 5:
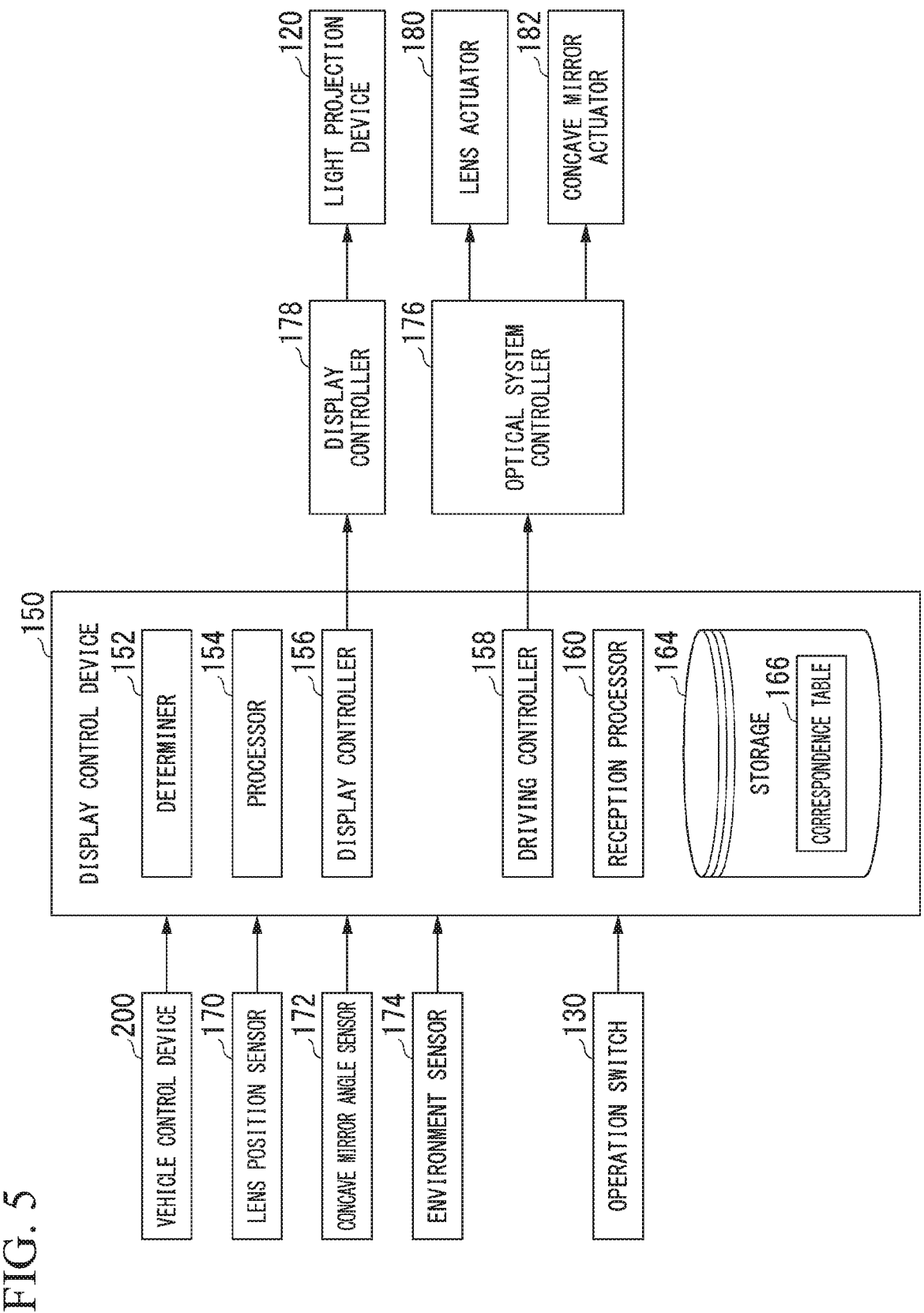
FIG. 5 is a diagram showing a configuration example of the display device centering on a display control device.

The display control device 150 controls the display of the virtual image VI which is visually recognized by the driver. FIG. 5 is a diagram showing a configuration example of the display device 100 centering on the display control device 150. In the example of FIG. 5, a lens position sensor 170, a concave mirror angle sensor 172, an environment sensor 174, an optical system controller 176, a display controller 178, a lens actuator (an example of a first actuator) 180, a concave mirror actuator (an example of a second actuator) 182, and a light projection device 120 which are included in the display device 100 are shown in addition to the display control device 150.

The lens position sensor 170 detects the positions of one or more lenses included in the optical mechanism 122. The concave mirror angle sensor 172 detects a rotation angle of the concave mirror 126 around the above-described Y-axis shown in FIG. 4. For example, the environment sensor 174 detects temperatures of the light projection device 120 and the optical mechanism 122. The environment sensor 174 may detect the illuminance in the vicinity of the vehicle M and the speed and steering angle of the vehicle M and may detect an object which is present peripherally (for example, an obstacle such as another vehicle or a pedestrian).

The optical system controller 176 drives the lens actuator 180 on the basis of a control signal which is output by the driving controller 158 to adjust a virtual image visible distance D. The optical system controller 176 drives the concave mirror actuator 182 on the basis of a control signal which is output by the driving controller 158 to adjust a rotation angle of the concave mirror 126.

The display controller 178 controls details and display conditions of an image which is output by the light projection device 120. The display conditions of the image are, for example, a luminance, a display position, a size, and the like.

The lens actuator 180 acquires a driving signal which is output by the optical system controller 176 and moves the positions of one or more lenses included in the optical mechanism 122 by driving a motor or the like on the basis of the acquired driving signal. Thereby, the virtual image visible distance D is adjusted.

The concave mirror actuator 182 acquires a driving signal which is output by the optical system controller 176 and rotates the concave mirror actuator 182 around the Y-axis by driving a motor or the like on the basis of the acquired driving signal to adjust a reflection angle φ of the concave mirror 126. Thereby, a depression angle θ is adjusted.

The display control device 150 includes, for example, a determiner 152, a processor 154, a display controller 156, a driving controller 158, a reception processer 160, and a storage 164. These components are implemented by a hardware processor such as a central processer (CPU) executing a program (software). Some or all of these components may be implemented by hardware (a circuit unit; including circuitry) such as a large scale integration (LSI), an application specific integrated circuit (ASIC), a field-programmable gate array (FPGA), or a graphics processer (GPU) or may be implemented by cooperation of software and hardware. A program may be stored in advance in a storage device (not shown) such as an HDD or a flash memory of the display control device 150, or may be installed in the HDD or the flash memory of the display control device 150 by storing the program in a detachable storage medium such as a DVD or a CD-ROM and mounting the storage medium in a drive device.

The storage 164 is realized by a storage device such as a random access memory (RAM), a read only memory (ROM), a hard disk drive (HDD), or a flash memory. For example, a correspondence table 166 is stored in the storage 164. FIG. 6 is a diagram showing an example of details of the correspondence table 166. The correspondence table 166 is information in which images and events are associated with each other. The images are images to be provided to an occupant using the display device 100.

The events are events occurring depending on the state of the vehicle. The events include the necessity of a check with respect to a predetermined function and the occurrence of a warning such as the necessity of a check of a brake, the necessity of a check with respect to an engine, a distance from a preceding vehicle being set to a threshold value or less, or the necessity of a check with respect to an ACC, an LKAS, or a CMBS.

The events include, for example, the setting of headlights to be high-beams, the setting of an ACC, an LKAS, or a CMBS to be in an on-state, the cancellation of a door lock, the incomplete closing of a door, turn-on of fog lamps, the reception of a call in a telephone function equipped in the vehicle, approach to a timing of turning right or left to head toward a destination set in a navigation device, approach to a branch passage to head toward a destination, the reaching of a timing when an outdoor temperature set in advance is displayed, the detection of sleepiness by a sleepiness detection device mounted on the vehicle, and the like.

The events may include control that has been performed so that the driving source is set to be in an on-state (or control which is being performed) and control that has been performed so that the vehicle is set to be in an accessory on-state (or control which is being performed), or may include various events related to the vehicle.

The determiner 152 determines whether or not an operation for setting the display device 100 to be in an on-state has been performed. The determiner 152 determines whether or not control has been performed so that the driving source of the vehicle is set to be in an on-state or whether or not a preset event has occurred on the basis of information acquired from the vehicle control device 200.

The processer 154 specifies the type of event and an image based on the type of event with reference to the correspondence table 166.

The display controller 156 causes the display 110 to output an image (service image) associated with an event at a timing when a predetermined event occurs. The display controller 156 controls the visibility of an image in accordance with an operation performed on the adjustment switch 134 or the adjustment switch 136. The display controller 156 causes the display 110 to generate a warning image in a case in which an operation of reducing the visibility to a predetermined degree has been performed. The processing of the display controller 156 will be described later in detail.

The driving controller 158 generates a control signal (first control signal) for moving the positions of one or more lenses included in the optical mechanism 122 and a control signal (second control signal) for adjusting a rotation angle of the concave mirror 126 on the basis of control information of the display controller 156 and outputs the generated control signals to the optical system controller 176. The driving controller 158 generates a first control signal or a second control signal so that a virtual image VI including an image is visually recognized at a position instructed by the display controller 156 or a virtual image VI including an image is visually recognized at the virtual image visible distance D on the basis of the lens position detected by the lens position sensor 170 and the reflection angle φ of the concave mirror 126 detected by the concave mirror angle sensor 172, and outputs the generated control signals to the optical system controller 176.

The driving controller 158 adjusts the position of the virtual image VI or the virtual image visible distance D on the basis of operation details received by the operation switch 130. For example, the driving controller 158 outputs the first control signal for moving the position of the virtual image VI upward within the displayable area A1 to the optical system controller 176 in a case in which an operation of the adjustment switch 134 is received. The driving controller 158 outputs the first control signal for moving the position of the virtual image VI downward within the displayable area A1 to the optical system controller 176 in a case in which an operation of the adjustment switch 136 is received.

The reception processer 160 receives an inhibition instruction performed on the operation switch 130.

The vehicle control device 200 controls the vehicle or acquires detection results of various sensors mounted on the vehicle. For example, the vehicle control device 200 executes a driving support function of supporting the driving of the driver of the vehicle M. In a case in which the driving support function is executed, for example, the vehicle M controls either one or both of steering control and speed control independently of the driver's operations using driving operators (for example, the steering wheel 10, an accelerator pedal, and a brake pedal). For example, the vehicle control device 200 performs acceleration and deceleration control (speed control) based on the distance between the vehicle and a preceding vehicle so that the vehicle travels in a state where the distance between the vehicle and the preceding vehicle is kept constant, on the basis of information to be input through an object recognition device (not shown) mounted on the vehicle M at the time of executing an ACC as a driving support function. The vehicle control device 200 performs steering control so that the vehicle M travels while maintaining a traveling lane on which the vehicle is currently traveling at the time of executing an LKAS as a driving support function. The vehicle control device 200 performs deceleration control or stop control of the vehicle M in a case in which the distance between the vehicle and the preceding vehicle is less than a predetermined distance at the time of executing a CMBS as a driving support function. The vehicle control device 200 outputs, for example, the state of a driving support function to the display control device 150. The vehicle control device 200 outputs information (warning information) for giving a warning to the driver before executing an LKAS and a CMBS to the display control device 150. The warning information is, for example, a lane deviation alarm, a preceding vehicle approach alarm, or the like.

[Flowchart]

Figure 7:
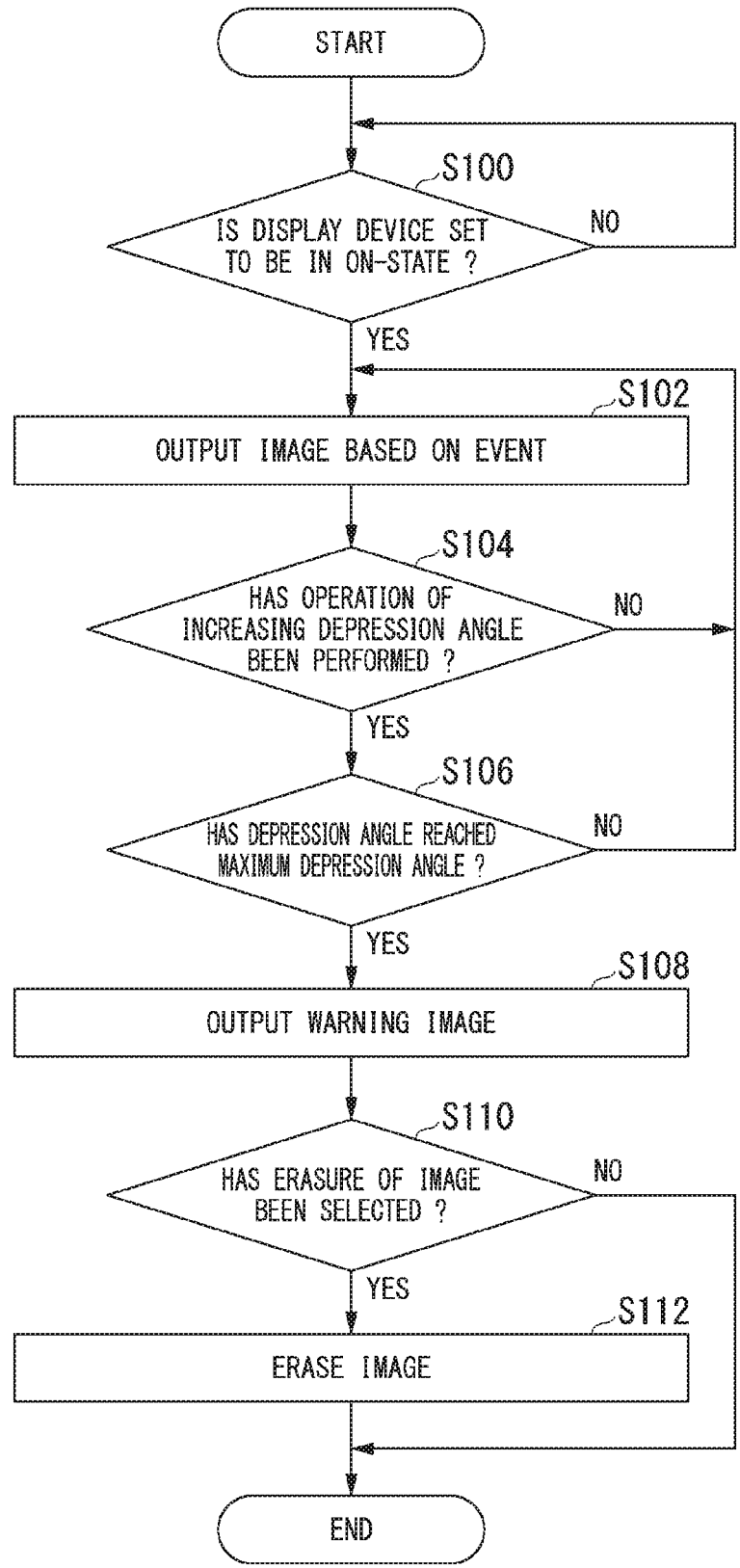
FIG. 7 is a diagram showing an example of a flow of processing executed by the display control device.

FIG. 7 is a diagram showing an example of a flow of processing executed by the display control device 152. First, the display controller 156 determines whether or not an operation of setting the display device 100 to be in an on-state has been performed (step S100). In a case in which an operation of setting the display device 100 to be in an on-state has been performed, the display controller 156 outputs an image based on an event (step S102).

Next, the display controller 156 determines whether or not an operation of increasing a depression angle has been performed (step S104). The operation of increasing a depression angle is an example of an operation of reducing the visibility of an image. In a case in which an operation of increasing a depression angle has not been performed, the processing returns to the process of step S102. In a case in which an operation of increasing a depression angle has been performed, the display controller 156 determines whether or not a depression angle has reached a preset maximum depression angle in accordance with the operation (step S106). In a case in which a depression angle has not reached the preset maximum depression angle in accordance with the operation, the processing returns to the process of step S102.

In a case in which the depression angle has reached the preset maximum depression angle in accordance with the operation, the display controller 156 causes the display 110 to output a warning image (step S108). Next, the display controller 156 determines whether or not the erasure of an image has been selected with respect to the output of the warning image (step S110). In a case in which the erasure of an image has not been selected, the processing of this flowchart is terminated.

In a case in which the erasure of an image has been selected, the display controller 156 causes the display 110 to stop the output of an image (step S112). The erasure of an image is, for example, the erasure of an image based on the corresponding event. That is, even when the erasure of an image has been selected, an image associated with an event different from the corresponding event may be displayed. Thereby, the processing of this flowchart is terminated. It is possible to reduce troublesomeness for an occupant through the above-described processing.

An operation of erasing an image, which is an operation for turning off the display device 100, may be an operation for the main switch 132 or may be a different operation. For example, the different operation is, for example, an operation of pressing the main switch 132 a predetermined number of times within a predetermined period of time. The operation of erasing an image may be a predetermined gesture. In this case, the display control device 150 includes an image processer. The image processer determines whether or not a predetermined gesture has been performed on the basis of an image captured by an in-car camera.

Figure 8:
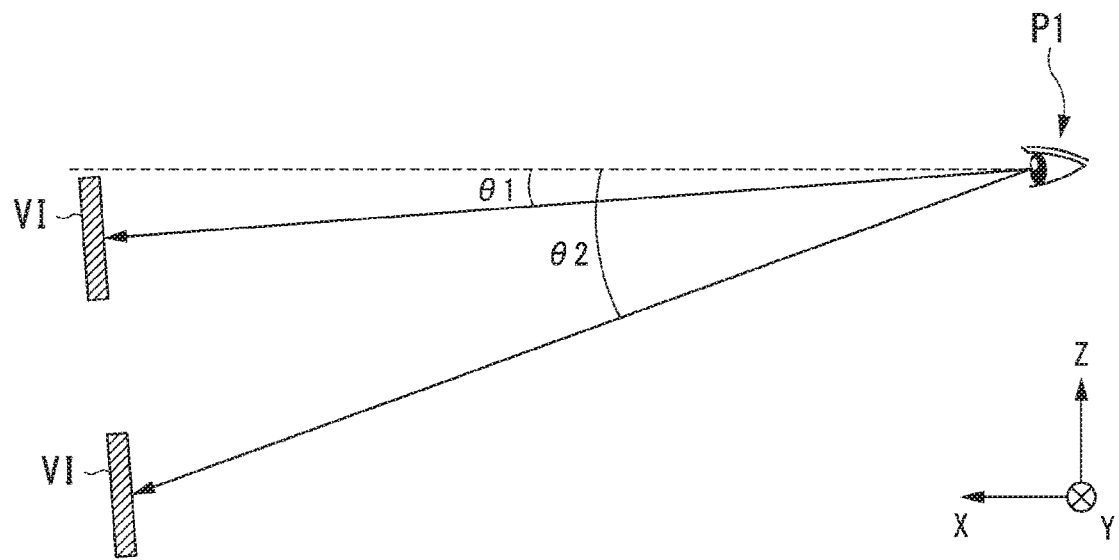
FIG. 8 is a diagram showing an example of a state where a depression angle becomes larger.

FIG. 8 is a diagram showing an example of a state where a depression angle increases. For example, when an operation of increasing a depression angle is performed in a case in which a virtual image VI is being visually recognized by an occupant at a position based on a depression angle θ1, an image is output so that the virtual image VI is visually recognized by the occupant at a position based on a depression angle θ2.

Figure 9:
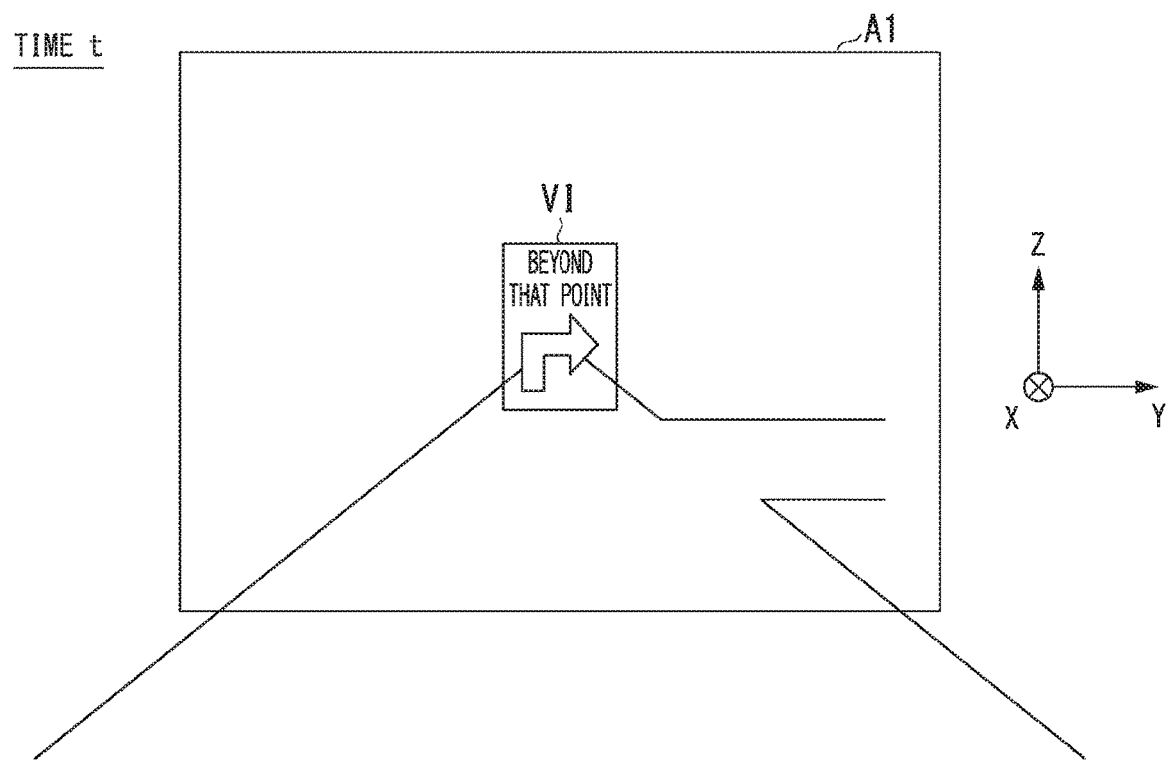
FIG. 9 is a diagram showing an example of changes in an image which is visually recognized by an occupant (Part 1).
Figure 10:
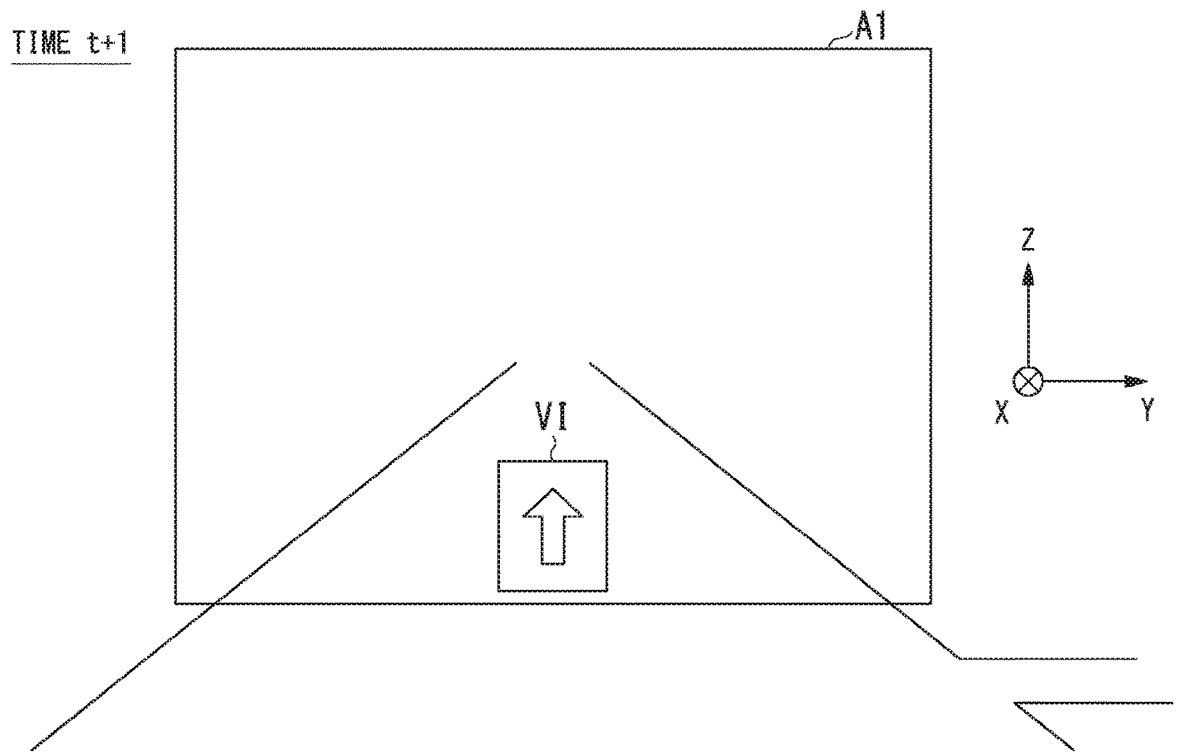
FIG. 10 is a diagram showing an example of changes in an image which is visually recognized by an occupant (Part 2).

FIGS. 9 and 10 are diagrams showing an example of changes in an image visually recognized by an occupant. For example, as shown in FIG. 9, it is assumed that a turn-by-turn image indicating a direction in which a vehicle heads toward a set destination is displayed in a case in which the vehicle passes through a road A at time t. In this case, it is assumed that an operation of making a display position of the above-described turn-by-turn image face downward (an operation of increasing a depression angle) has been performed. Then, as shown in FIG. 10, a display position of a turn-by-turn image displayed at time t+1 is visually recognized below the display position of the image at time t.

Figure 11:
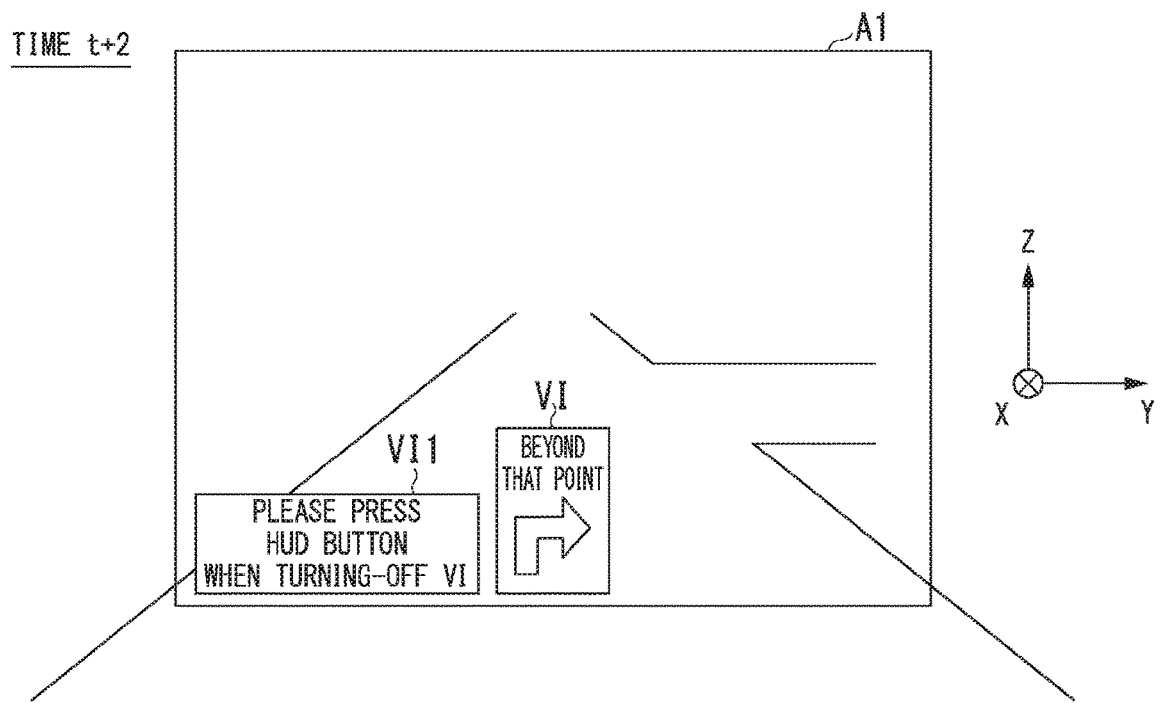
FIG. 11 is a diagram showing an example of a warning image.

Further, in a case in which an operation of increasing a depression angle has been performed at time t+2 and the depression angle has reached a maximum depression angle, a warning image VI1 is displayed as shown in FIG. 11. The warning image is an image including information for inquiring whether to display an image. In a case in which an operation indicating the erasure of an image has been performed, the display controller 156 erases a displayed image.

In this manner, the occupant can change the position of the image to reduce the visibility of the image, and thus it is possible to reduce troublesomeness. Further, in a case in which the occupant feels troublesomeness with respect to the image even when the visibility is reduced, it is possible to easily erase the image.

According to the above-described first embodiment, the display controller 156 increases a depression angle of an image visually recognized by an observer in accordance with an operation of increasing the depression angle of the image and provides a warning image to the occupant in a case in which the depression angle has reached a maximum depression angle, and thus it is possible to easily reduce the visibility of the image and reduce troublesomeness.

Second Embodiment

A second embodiment will be described. In the second embodiment, control for reducing the luminance of an image is performed. Hereinafter, differences from the first embodiment will be mainly described.

Figure 12:
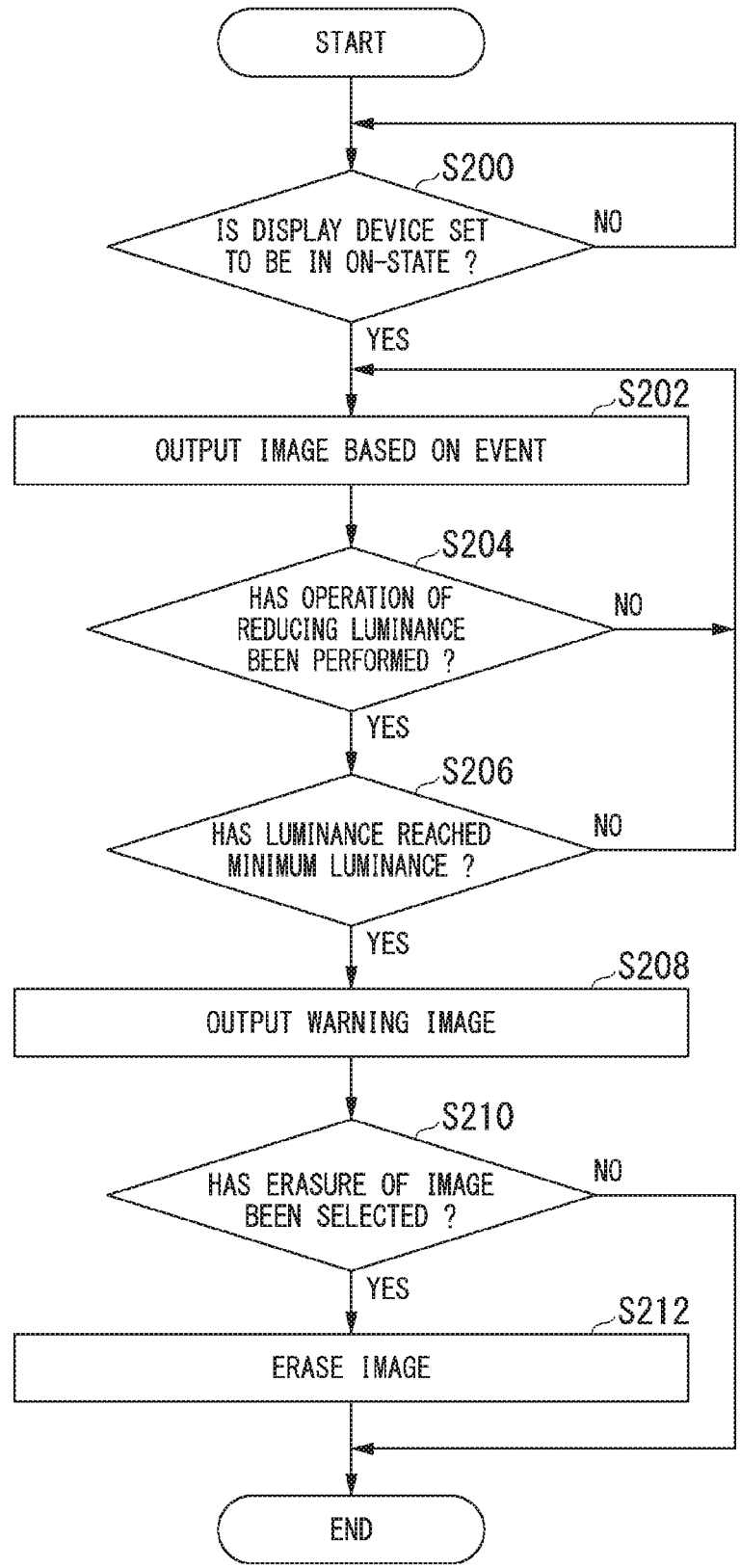
FIG. 12 is a diagram showing an example of a flow of processing executed by a display control device according to a second embodiment.

FIG. 12 is a diagram showing an example of a flow of processing executed by a display control device 152 of the second embodiment. Processes of steps S200, S202, and S208 to S212 in FIG. 12 are the same as the processes of steps S100, S102, and S108 to S112 in FIG. 7, and thus a description thereof will be omitted.

After the process of step S202 is performed, a display controller 156 determines whether or not an operation of reducing a luminance has been performed (step S204). The operation of reducing a luminance is an example of an operation of reducing the visibility of an image. In a case in which an operation of reducing a luminance has not been performed, the processing returns to the process of step S202. In a case in which an operation of reducing a luminance has been performed, the display controller 156 determines whether or not a luminance has reached a preset minimum luminance in accordance with the operation (step S206). In a case in which a luminance has not reached the preset minimum luminance in accordance with the operation, the processing returns to the process of step S202. In a case in which the luminance has reached the preset minimum luminance in accordance with the operation, the display controller 156 causes a display 110 to output a warning image (step S208), and the processing proceeds to the process of step S210. It is possible to reduce troublesomeness for an occupant through the above-described processing.

Figure 13:
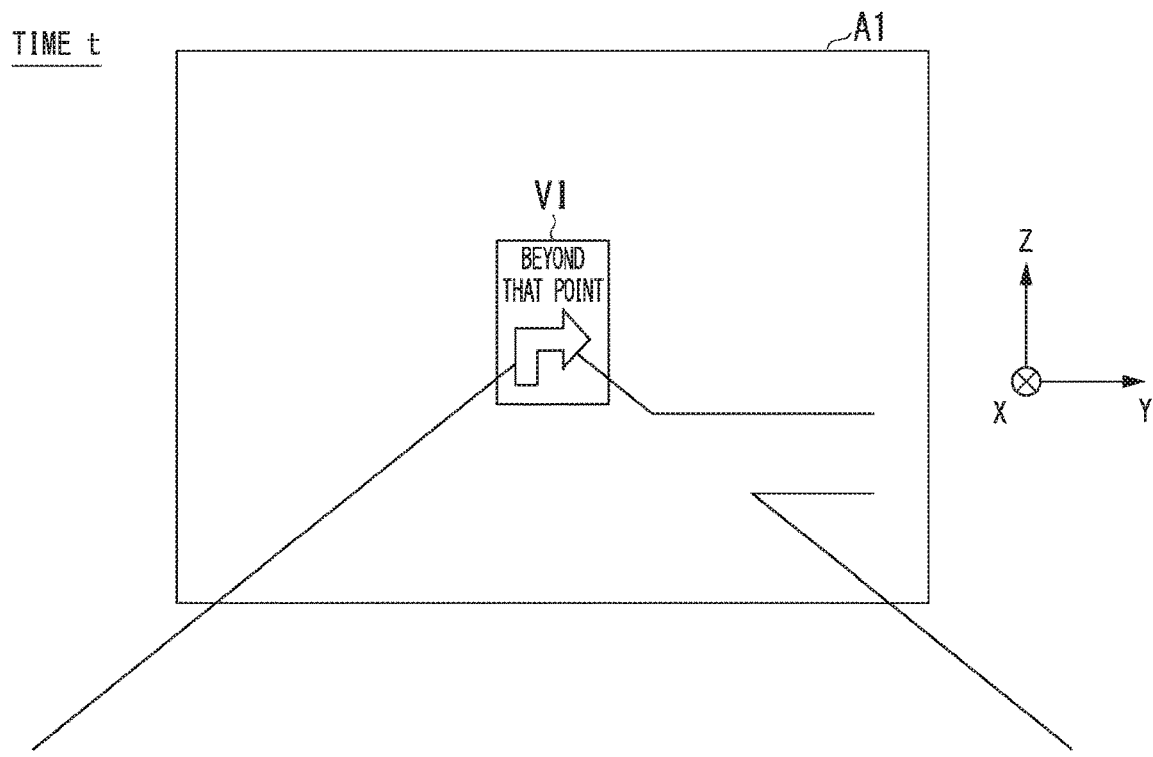
FIG. 13 is a diagram showing an example of changes in an image which is visually recognized by an occupant (Part 3).
Figure 14:
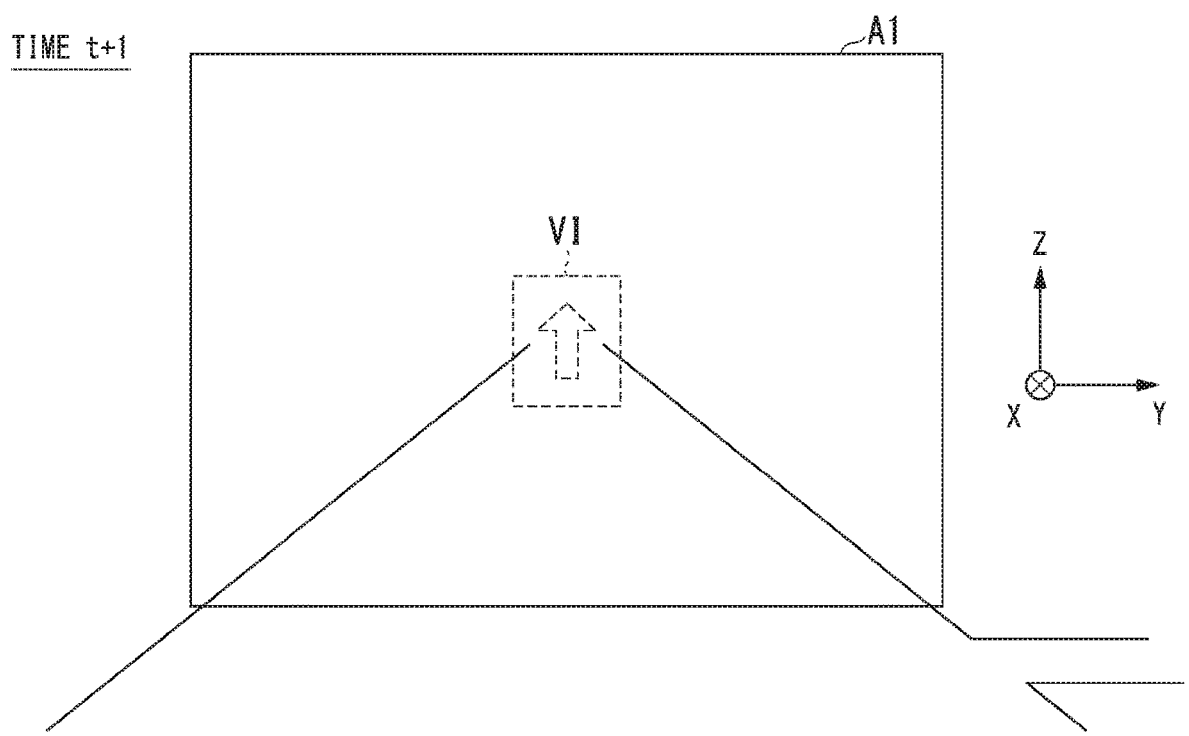
FIG. 14 is a diagram showing an example of changes in an image which is visually recognized by an occupant (Part 4).

FIGS. 13 and 14 are diagrams showing an example of changes in an image which is visually recognized by an occupant. For example, as shown in FIG. 13, it is assumed that a turn-by-turn image indicating a direction in which a vehicle heads toward a set destination is displayed in a case in which the vehicle passes through a road A at time t. In this case, it is assumed that an operation of reducing the luminance of the above-described turn-by-turn image has been performed. Then, as shown in FIG. 14, control is performed so that the luminance of the turn-by-turn image displayed at time t+1 is lower than the luminance of an image at time t.

Further, when an operation of reducing a luminance is performed at time t+2, a warning image is displayed as shown in FIG. 11 described above.

In this manner, the occupant can change the position of the image to reduce the visibility of the image, and thus it is possible to reduce troublesomeness. Further, in a case in which the occupant feels troublesomeness with respect to the image even when the visibility is reduced, it is possible to easily erase the image.

According to the above-described second embodiment, the display controller 156 reduces the luminance of an image in accordance with an operation of reducing the luminance of the image and provides a warning image to the occupant in a case in which the luminance has reached a minimum luminance, and thus it is possible to easily reduce the visibility of the image and reduce troublesomeness.

Third Embodiment

A third embodiment will be described. In the third embodiment, control for increasing a depression angle is performed, and control for reducing the luminance of an image is performed after the depression angle has reached a maximum depression angle. Hereinafter, differences from the first embodiment will be mainly described.

Figure 15:
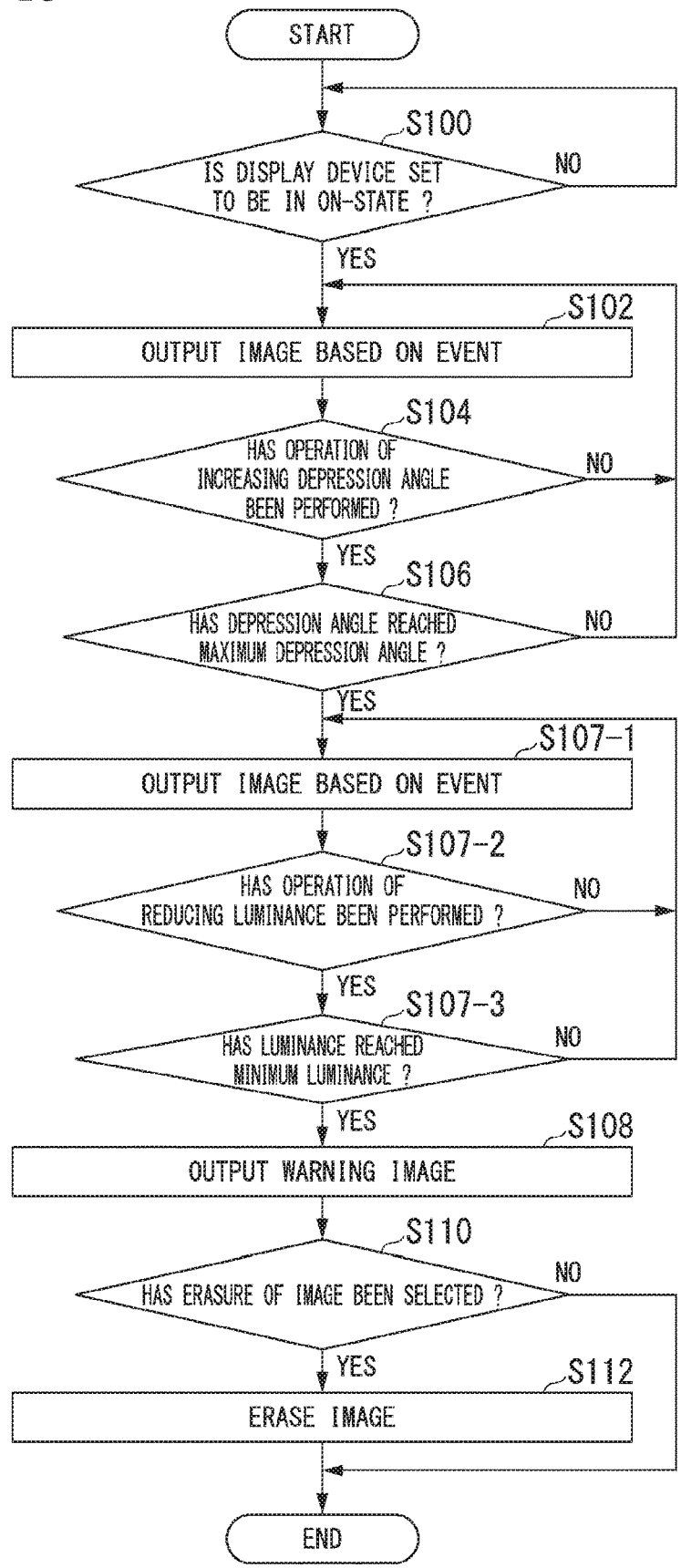
FIG. 15 is a diagram showing an example of a flow of processing executed by a display control device according to a third embodiment.

FIG. 15 is a diagram showing an example of a flow of processing executed by a display control device 152 of a third embodiment. Processes of steps S100 to S106, and S108 to S112 in FIG. 15 are the same as the processes of the same step numbers as those in FIG. 7, and thus the description thereof will be omitted.

In a case in which a depression angle has reached a preset maximum depression angle in accordance with an operation in step S106, the display controller 156 causes a display 110 to continuously output an image based on an event (step S107-1). Next, a display controller 156 determines whether or not an operation of reducing a luminance has been performed (step S107-2). In a case in which an operation of reducing a luminance has not been performed, the processing returns to the process of step S107-1. In a case in which an operation of reducing a luminance has been performed, the display controller 156 determines whether or not a luminance has reached a preset minimum luminance in accordance with the operation (step S107-3). In a case in which a luminance has not reached the preset minimum luminance in accordance with the operation, the processing returns to the process of step S107-1. In a case in which a luminance has reached the preset minimum luminance in accordance with the operation, the display controller 156 causes the display 110 to output a warning image (step S108).

Figure 16:
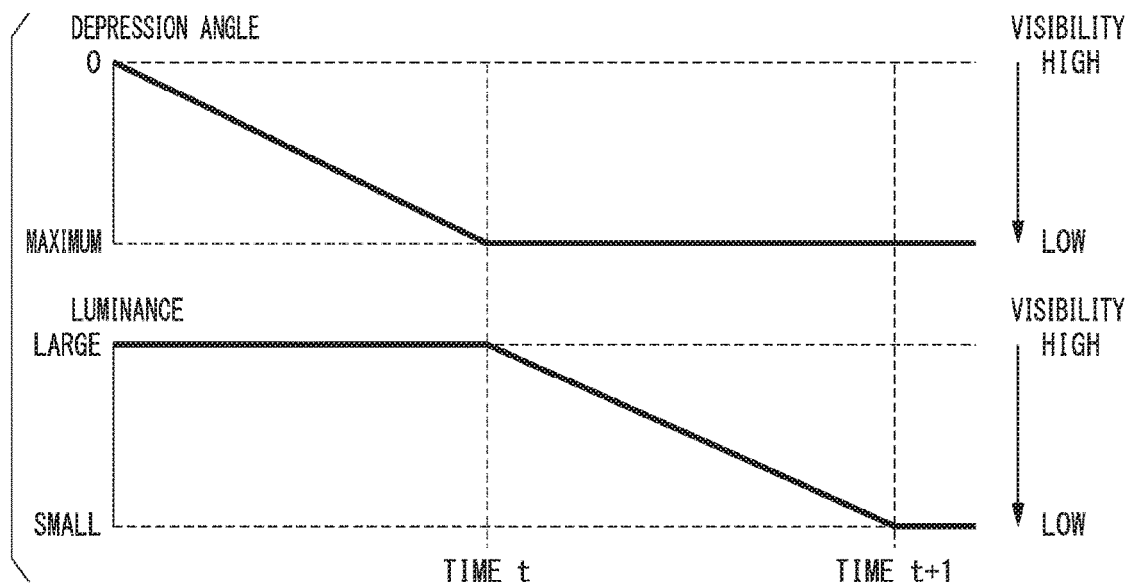
FIG. 16 is a diagram showing an example of details of changes in a depression angle, a luminance, and a visibility.
Figure 17:
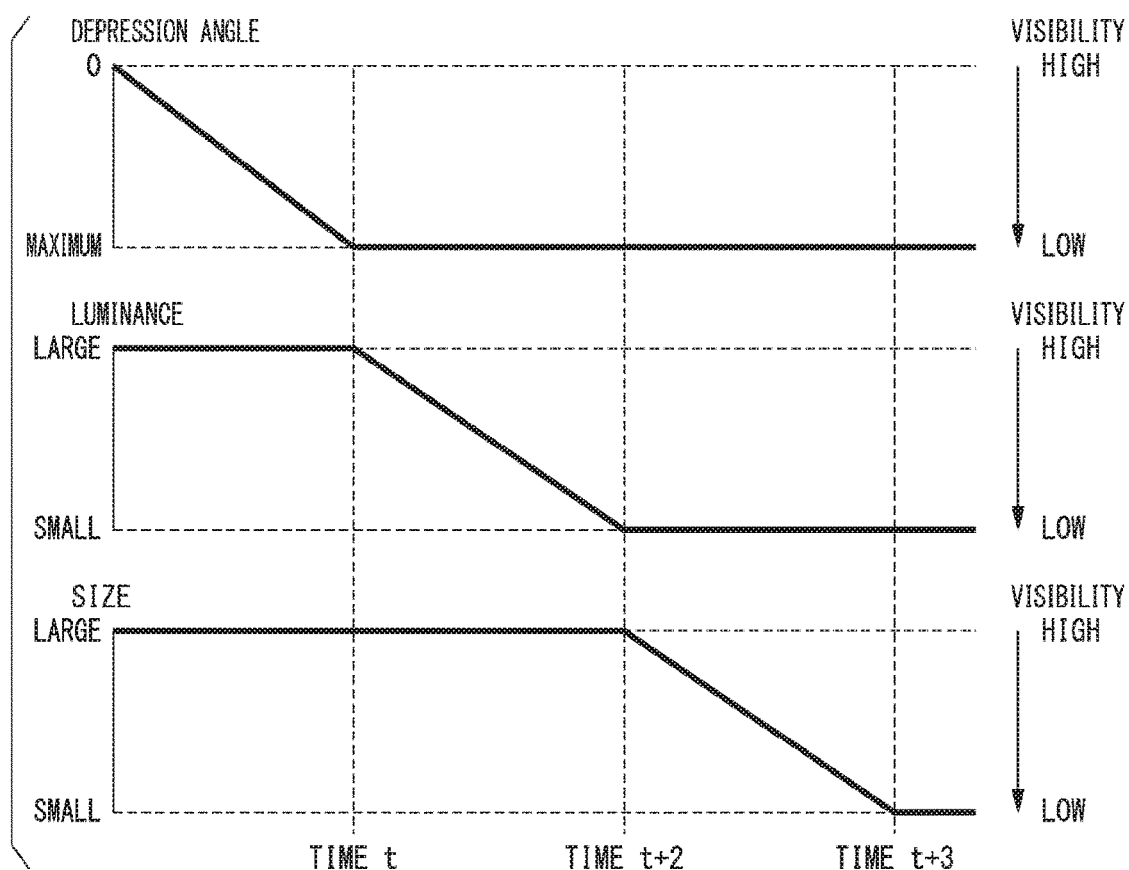
FIG. 17 is a diagram showing an example of details of changes in a depression angle, a luminance, a size, and a visibility.

FIG. 16 is a diagram showing an example of details of changes in a depression angle, a luminance, and a visibility. The vertical axis in the upper diagram in FIG. 16 represents depression angle. The vertical axis in the lower diagram in FIG. 17 represents luminance. As the depression angle increases or as the luminance decreases, the visibility of an image decreases. The horizontal axis in FIG. 16 represents time.

For example, when an adjustment switch 136 is further operated in a case in which the adjustment switch 136 is operated and a depression angle has reached a maximum depression angle at time t, the luminance of an image decreases seamlessly. That is, an occupant can easily control the image so as to reduce a visibility by operating the adjustment switch 136. As a result, it is possible to easily reduce the visibility of the image and reduce troublesomeness for the occupant.

In contrast to the above-described order of control, when the adjustment switch 136 is further operated in a case in which the luminance of the image has reached a minimum luminance, control may be performed so that a depression angle of the image increases seamlessly.

According to the above-described third embodiment, the display controller 156 increases a depression angle at a position where an image is visually recognized by an observer in accordance with an operation in a case in which the depression angle is less than a maximum depression angle, reduces the luminance of the image in accordance with an operation in a case in which the depression angle has reached the maximum depression angle, and causes the display 110 to output a warning image in a case in which the magnitude of the luminance of the image has reached a threshold value in accordance with an operation, and thus it is possible to easily reduce the visibility of the image and reduce troublesomeness for an occupant.

Fourth Embodiment

A fourth embodiment will be described. In the fourth embodiment, an image is controlled so that the size of the image is reduced. Hereinafter, differences from the first embodiment will be mainly described.

FIG. 17 is a diagram showing an example of details of changes in a depression angle, a luminance, a size, and a visibility. The vertical axis in the upper diagram in FIG. 17 represents depression angle, the vertical axis in the intermediate diagram in FIG. 17 represents luminance, and the vertical axis in the lower diagram in FIG. 17 represents size. As the size of an image decreases, the visibility of the image decreases. The horizontal axis in FIG. 17 represents time.

For example, when an adjustment switch 136 is further operated in a case in which the adjustment switch 136 is operated and a depression angle has reached a maximum depression angle, the luminance of an image decreases seamlessly. Further, when the adjustment switch 136 is further operated in a case in which the adjustment switch 136 is operated and the luminance of an image has reached a minimum luminance, the size of the image decreases seamlessly. Further when the adjustment switch 136 is operated and the size of an image reaches a minimum size, a warning image is displayed. That is, an occupant can easily control the image so as to reduce the visibility of the image by operating the adjustment switch 136. As a result, it is possible to reduce troublesomeness for the occupant.

The order of changes in the depression angle, the luminance, and the size of an image in a case in which the adjustment switch 136 is operated may be changed. For example, a display mode of the image may be changed so that the visibility of the image decreases in order of a size, a depression angle, and a luminance of the image.

According to the above-described fourth embodiment, a display controller 156 performs control so that a display mode (for example, a depression angle) of an image satisfies a first setting condition in accordance with an operation in a case in which the display mode of the image does not satisfy the first setting condition, and performs control so that a display mode (for example, a luminance) of an image satisfies a second setting condition in accordance with an operation in a case in which the display mode of the image satisfies the first setting condition. The display controller 156 performs control so that the display mode (for example, the size) of an image satisfies a third setting condition in accordance with an operation in a case in which the display mode of the image satisfies the second setting condition. In this manner, in a case in which a display mode of an image satisfies a condition, the display mode is controlled in accordance with an operation so as to satisfy the next condition. As a result, it is possible to easily reduce the visibility of the image and reduce troublesomeness for an occupant.

Description has been given on the assumption that a warning is displayed as a warning image, but instead (or additionally), an occupant may be notified of a warning using a sound, a vibration, or the like. In this case, a display device 100 includes an output device that outputs a sound or an output device that generates vibration.

The display device 100 may project an image onto a light transmissive reflection member such as a combiner provided between the position of a driver and a front windshield 20, instead of directly projecting an image onto the front windshield 20.

Troublesomeness of an image for an occupant may be different due to, for example, the weather, a scene (for example, a city, a suburb, a tunnel) outside a vehicle, or the like. The occupant can easily reduce the visibility of an image in accordance with such weather, scene, or the like. As a result, it is possible to reduce troublesomeness for the occupant.

According to the above-described embodiments, a display device includes an image generator that generates a service image to be visually recognized by an observer by outputting light for forming an image toward a reflector reflecting incident light toward the observer's eyes and superimposing the light on a scene, a receiver that receives the observer's operation of reducing the visibility of the image, and a controller that controls the visibility of the service image in accordance with the operation performed on the receiver, and the controller can reduce troublesomeness for an occupant by causing the image generator to generate a warning image in a case in which the operation of reducing the visibility to a predetermined degree is performed.

Although a mode for carrying out the present invention has been described using the embodiments, the present invention is not limited to the embodiments, and various modifications and substitutions can be added without departing from the scope of the present invention.

What is claimed is:

1. A display device comprising:
   an image generator configured to generate a service image to be visually recognized by an observer by outputting light for forming an image toward a reflector reflecting incident light toward the observer's eyes and superimposing the light on a scene;
   a receiver configured to receive the observer's operation of reducing a visibility of the image; and
   a controller configured to control a visibility of the service image in accordance with the operation performed on the receiver,
   wherein the controller is configured to cause the image generator to generate a warning image in a case in which the operation of reducing the visibility to a predetermined degree is performed,
   the operation includes an operation of increasing a depression angle at a position where the service image is visually recognized by the observer and an operation of reducing a luminance of the service image, and
   the controller is further configured to increase the depression angle at the position where the service image is visually recognized by the observer in accordance with the operation in a case in which the depression angle is less than a maximum depression angle, reduce the luminance of the service image in accordance with the operation in a case in which the depression angle is the maximum depression angle, and cause the image generator to output the warning image in a case in which a magnitude of the luminance has reached a threshold value.

2. The display device according to claim 1, wherein the warning image is an image including information for inquiring whether to generate the service image.

3. A display device comprising:
   an image generator configured to generate a service image to be visually recognized by an observer by outputting light for forming an image toward a reflector reflection incident light toward the observer's eyes and superimposing the light on a scene;
   a receiver configured to receive the observer's operation of reducing a visibility of the image; and
   a controller configured to control a visibility of the service image in accordance with the operation performed on the receiver,
   wherein the controller is configured to cause the image generator to generate a warning image in a case in which the operation of reducing the visibility to a predetermined degree is performed,
   the operation includes an operation of increasing a depression angle at a position where the service image is visually recognized by the observer and an operation of reducing a size of the service image, and
   the controller is configured to increase the depression angle at the position where the service image is visually recognized by the observer in accordance with the operation in a case in which the depression angle is less than a maximum depression angle, reduce the size of the service image in accordance with the operation in a case in which the depression angle is the maximum depression angle, and cause the image generator to output the warning image in a case in which the size has reached a threshold value.

4. The display device according to claim 3, wherein the warning image is an image including information for inquiring whether to generate the service image.

5. A display device comprising:
   an image generator configured to generate a service image to be visually recognized by an observer by outputting light for forming an image toward a reflector reflecting incident light toward the observer's eyes and superimposing the light on a scene;
   a receiver configured to receive the observer's operation of reducing a visibility of the image; and
   a controller configured to control a visibility of the service image in accordance with the operation performed on the receiver,
   wherein the controller is configured to cause the image generator to generate a warning image in a case in which the operation of reducing the visibility to a predetermined degree is performed,
   the operation includes an operation of reducing a luminance of the service image and an operation of reducing a size of the service image, and
   the controller is configured to reduce the luminance of the service image in a case in which the luminance is less than a minimum luminance, reduce the size of the service image in accordance with the operation in a case in which the luminance has a minimum value, and cause the image generator to output the warning image in a case in which the size has reached a threshold value.

6. The display device according to claim 5, wherein the warning image is an image including information for inquiring whether to generate the service image.

* * * * *